(12) United States Patent
Tanimura et al.

(10) Patent No.: US 9,593,270 B2
(45) Date of Patent: Mar. 14, 2017

(54) ADHESIVE SHEET

(75) Inventors: Miki Tanimura, Osaka (JP); Hitoshi Takahira, Osaka (JP); Satomi Yoshie, Osak (JP)

(73) Assignee: NITTO DENKO CORPORATION, Osaka (JP)

( * ) Notice: Subject to any disclaimer, the term of this patent is extended or adjusted under 35 U.S.C. 154(b) by 395 days.

(21) Appl. No.: 13/513,409

(22) PCT Filed: Nov. 30, 2010

(86) PCT No.: PCT/JP2010/071397
§ 371 (c)(1),
(2), (4) Date: Jun. 1, 2012

(87) PCT Pub. No.: WO2011/068102
PCT Pub. Date: Jun. 9, 2011

(65) Prior Publication Data
US 2012/0244328 A1 Sep. 27, 2012

(30) Foreign Application Priority Data

Dec. 3, 2009 (JP) .................. 2009-275347

(51) Int. Cl.
*C09J 175/06* (2006.01)
*C08G 18/42* (2006.01)
(Continued)

(52) U.S. Cl.
CPC ............ *C09J 175/06* (2013.01); *B32B 7/12* (2013.01); *B32B 27/36* (2013.01);
(Continued)

(58) Field of Classification Search
CPC ..................................................... C08L 69/005
(Continued)

(56) References Cited

U.S. PATENT DOCUMENTS

| | | | | |
|---|---|---|---|---|
| 5,462,797 A | * | 10/1995 | Williams | ............ C08F 283/006 428/345 |
| 5,498,670 A | * | 3/1996 | Aoyama et al. | ............... 525/217 |
| 6,218,006 B1 | * | 4/2001 | Tokunaga | ............... C09J 169/00 428/355 AC |

FOREIGN PATENT DOCUMENTS

| | | |
|---|---|---|
| GB | 2019248 | 10/1979 |
| JP | 54-139946 | 10/1979 |

(Continued)

OTHER PUBLICATIONS

European Search report issued with respect to application No. 10834552.1, mail date is Sep. 4, 2014.
(Continued)

*Primary Examiner* — Laura Figg
(74) *Attorney, Agent, or Firm* — Greenblum & Bernstein, P.L.C.

(57) ABSTRACT

The present invention provides a pressure-sensitive adhesive sheet containing a pressure-sensitive adhesive layer that contains a polyester resin as a main component, in which the pressure-sensitive adhesive layer having a laminate structure that contains at least one layer LA where a polyester resin $E_A$ having Mw of from $4 \times 10^4$ to $12 \times 10^4$ is crosslinked and at least one layer LB where a polyester resin $E_B$ having Mw of from $0.2 \times 10^4$ to $1 \times 10^4$ is crosslinked, and at least one surface of the pressure-sensitive adhesive layer is constituted by the layer LA.

16 Claims, 2 Drawing Sheets

(51) Int. Cl.
*C09J 7/00* (2006.01)
*C09J 7/02* (2006.01)
*C09J 167/00* (2006.01)
*B32B 7/12* (2006.01)
*B32B 27/36* (2006.01)

(52) U.S. Cl.
CPC ............ *C08G 18/4288* (2013.01); *C09J 7/00* (2013.01); *C09J 7/0207* (2013.01); *C09J 167/00* (2013.01); *C09J 2201/134* (2013.01); *C09J 2201/36* (2013.01); *C09J 2201/622* (2013.01); *C09J 2467/00* (2013.01); *Y10T 428/2495* (2015.01); *Y10T 428/264* (2015.01); *Y10T 428/269* (2015.01); *Y10T 428/2848* (2015.01); *Y10T 428/2852* (2015.01)

(58) Field of Classification Search
USPC .......................................... 428/213, 98–220
See application file for complete search history.

(56) References Cited

FOREIGN PATENT DOCUMENTS

| JP | 6-145633 | 5/1994 | |
|---|---|---|---|
| JP | 6-172715 | 6/1994 | |
| JP | 2003-3133 | 1/2003 | |
| JP | 2008-13593 | 1/2008 | |
| JP | 2008013593 A | * | 1/2008 |
| JP | 2009013201 A | | 1/2009 |
| WO | 2009/142272 | | 11/2009 |

OTHER PUBLICATIONS

Office Action with respect to Chinese Application No. 201080054751.1, and English translation, mail date is Jul. 25, 2013.
Sun Jie et al., "Thermal Stability of Aliphatic Polyester", Polymer Material Science and Engineering, vol. 23, No. 6, Nov. 15, 2007, pp. 144-147.
China Office Action, mail date is Mar. 11, 2013, along with an English language translation thereof.
Search report from International Application No. PCT/JP2010/071397, mail date is Mar. 8, 2011.
Search report from International Preliminary Report on Patentability for International Application No. PCT/JP2010/071397, mail date is Feb. 28, 2011.
"Charakterisierung eines ultrahochmolekularen Polymethacrylats mit flussigkristalliner Seitengruppe in verdunnter Losung", Ulrike Wenzel, 2000; with European Office Action issued with respect to application No. 10834552.1, mail late of Aug. 30, 2016, provided as concise explanation in English.

* cited by examiner

ADHESIVE SHEET

TECHNICAL FIELD

The present invention relates to a pressure-sensitive adhesive sheet provided with a pressure-sensitive adhesive layer that comprises a polyester resin as a main component thereof.

BACKGROUND ART

A pressure-sensitive adhesive comprising a polyester as the base polymer (hereinafter this may be referred to as a polyester-based adhesive) is characterized in that it can readily realize higher heat resistance as compared with an ordinary acrylic adhesive (adhesive comprising an acrylic polymer as the base polymer). As a patent reference relating to the polyester-based adhesive, there is mentioned Patent Reference 1.

CITATION LIST

Patent Reference

Patent Reference 1: JP-A 6-145633

SUMMARY OF THE INVENTION

Problems that the Invention is to Solve

Recently, performances required to adhesives are increasingly-sophisticated, and polyester-based adhesives are also required to have further increased adhesive force while maintaining good heat resistance thereof. However, in general, heat resistance (this may be evaluated according to the heat resistance retention thereof to be mentioned below or the like) and adhesive force of adhesives are contradictory characteristics to each other, and it is difficult to satisfy both these characteristics on high levels.

An object of the invention is to provide a pressure-sensitive adhesive sheet provided with a pressure-sensitive adhesive layer that comprises a polyester resin as a main component thereof and capable of realizing a good balance of heat resistance and adhesive force both on high levels.

Means for Solving the Problems

According to the invention, there is provided a pressure-sensitive adhesive sheet provided with a pressure-sensitive adhesive layer that comprises a polyester resin as a main component thereof. The pressure-sensitive adhesive layer has a laminate structure containing: at least one layer LA where a polyester resin $E_A$ having a weight-average molecular weight (Mw) of from $4 \times 10^4$ to $12 \times 10^4$ is crosslinked; and at least one layer LB where a polyester resin $E_B$ having Mw of from $0.2 \times 10^4$ to $1 \times 10^4$ is crosslinked. Here, at least one surface of the pressure-sensitive adhesive layer is formed of the layer LA. The pressure-sensitive adhesive sheet provided with such a pressure-sensitive adhesive layer having the laminate structure that comprises the layers LA and LB each formed by crosslinking polyester resins having a different Mw can realize heat resistance and adhesive force both on high levels.

In one embodiment of the technique disclosed here, the pressure-sensitive adhesive layer preferably contains at least two layers LA, and one surface and the other surface of the pressure-sensitive adhesive layer are formed of the first layer LA and the second layer LA, respectively. The pressure-sensitive adhesive sheet having such the constitution is favorable, for example, for a pressure-sensitive adhesive sheet of which each surface of the pressure-sensitive adhesive layer is usable as a pressure-sensitive adhesive surface (that is, surface to be attached to adherend under pressure) (that is, favorable for a double-coated pressure-sensitive adhesive sheet).

The gel fraction $G_{LA}$ of the layer LA may be, for example, from 30 to 65%. The gel fraction $G_{LB}$ of the layer LB may be, for example, from 70 to 90%. When one or both of $G_{LA}$ and $G_{LB}$ is excessively lower than the above ranges, the heat resistance (for example, heat resistance retention) of the pressure-sensitive adhesive sheet may tend to be low. When one or both of $G_{LA}$ and $G_{LB}$ is excessively higher than the above ranges, the adhesive force may tend to be low. The sheet of which one or both of (preferably, both of) $G_{LA}$ and $G_{LB}$ is within the above ranges can realize a good balance of heat resistance and adhesive force both on higher levels.

The thickness $T_{LA}$ of the layer LA constituting at least one surface of the pressure-sensitive adhesive layer may be, for example, from 5 μm to 100 μm. In one embodiment of the technique disclosed here, the layer LB having a thickness $T_{LB}$ of from 10 μm to 2000 μm is preferably laminated on the back of the layer LA that constitutes at least one surface of the pressure-sensitive adhesive layer. The pressure-sensitive adhesive sheet having such the constitution can realize a good balance of heat resistance and adhesive force both on higher levels.

In one embodiment of the technique disclosed here, it is preferred that at least one surface (pressure-sensitive adhesive surface) of the pressure-sensitive adhesive layer is formed of the layer LA having a thickness of $T_{LA}$, the layer LB having a thickness of $T_{LB}$ is laminated on the back of the layer LA, and the relation between $T_{LA}$ and $T_{LB}$ satisfies the following formula: $1 < T_{LB}/T_{LA} \leq 50$. Such the pressure-sensitive adhesive sheet can realize a good balance of heat resistance and adhesive force both on higher levels.

In one embodiment of the technique disclosed here, at least one of the polyester resin $E_A$ and the polyester resin $E_B$ is preferably crosslinked with a tri- or more-functional isocyanate (that is, a compound having, on average, at least three isocyanate groups (—N=C=O groups) per molecule). Above all, as an especially preferred crosslinking agent, a tri- or more-functional isocyanate that is an isocyanurate of a di- or more-functional isocyanate (trimer adduct) is exemplified.

In one preferred embodiment, the polyester resin $E_A$ and the polyester resin $E_B$ each contain a polycarboxylic acid component and a polyalcohol component, and the combination of the polycarboxylic acid component and the polyalcohol component constituting the polyester resin $E_A$ is the same as the combination of the polycarboxylic acid component and the polyalcohol component constituting the polyester resin $E_B$. The layers LA and LB in which the polyester resin $E_A$ and the polyester resin $E_B$ having the relation as above are crosslinked, respectively, can be excellent in the interlayer adhesiveness (interlayer adhesion strength) between these layers. Accordingly, such the polyester resins $E_A$ and $E_B$ can realize a pressure-sensitive adhesive sheet that exhibits more uniform and more stable adhesion properties (heat resistance retention, adhesive force, etc.). Further, a pressure-sensitive adhesive sheet provided with a pressure-sensitive adhesive layer more excellent in transparency can be formed.

As the polycarboxylic acid component for use in synthesis of one or both of the polyester resins $E_A$ and $E_B$, an aliphatic dicarboxylic acid having a dimerized structure of an unsaturated fatty acid can be preferably employed. As the polyalcohol component for use in synthesis of one or both of the polyesters $E_A$ and $E_B$, an aliphatic diol having a structure where an aliphatic dicarboxylic acid of a dimerized unsaturated fatty acid is subjected to hydrogen-addition (hydrogenation) can be preferably employed. Such the polyester resins $E_A$ and $E_B$ can realize a pressure-sensitive adhesive sheet of higher performance. The unsaturated fatty acid (for example, unsaturated fatty acids having at least 18 carbon atoms) can be obtained from plants, and usableness of the aliphatic dicarboxylic acid and/or the aliphatic diol synthesized from the plant-derived starting material (unsaturated fatty acid), as the starting materials, is preferred from the viewpoint of environmental load reduction.

In one preferred embodiment of the technique disclosed here, the polyester resins $E_A$ and $E_B$ each are a polycondensate of a dimer acid with a dimer diol. The dimer acid and the dimer diol are typically those obtained derived from plants (in other words, they are plant-derived materials). The pressure-sensitive adhesive sheet that uses such the polyester resins $E_A$ and $E_B$ is preferred from the viewpoint of environmental load reduction.

MODE FOR CARRYING OUT THE INVENTION

Preferred embodiments for carrying out the invention are described below. In this description, the matters that are the others than those specifically referred to herein and are the matters necessary for carrying out the invention can be understood as the matters that could be modified within workshop modification by anyone skilled in the art based on the background technique in the art. The invention can be carried out on the basis of the contents disclosed in this description and the technical common sense in the art.

The technique disclosed here is applicable to various pressure-sensitive adhesive sheets provided with a pressure-sensitive adhesive layer (polyester-based pressure-sensitive adhesive layer) that comprises a polyester resin as the main component thereof. "A pressure-sensitive adhesive layer that comprises a polyester resin as the main component thereof" as referred to herein means that the mass of the polyester resin accounts for at least 50% by mass of whole the pressure-sensitive adhesive layer. The pressure-sensitive adhesive sheet may be a substrate-attached pressure-sensitive adhesive sheet of a form having the pressure-sensitive adhesive layer on one side of a sheet substrate (support), or a substrate-attached pressure-sensitive adhesive sheet of a form having the pressure-sensitive adhesive layer on both sides of a substrate (double-coated pressure-sensitive adhesive sheet, typically double-coated pressure-sensitive adhesive tape), or a substrate-less pressure-sensitive adhesive sheet (that is, a double-coated pressure-sensitive adhesive sheet not having a support) of a form where the pressure-sensitive adhesive layer is supported by a release liner (understood as a sheet substrate having release surface). The concept of the pressure-sensitive adhesive sheet as referred to herein includes a pressure-sensitive adhesive tape, a pressure-sensitive adhesive label, a pressure-sensitive adhesive film, etc. In this description, percentage and part all expressed by mass are the same as percentage and part to be expressed by weight.

Figure 1:
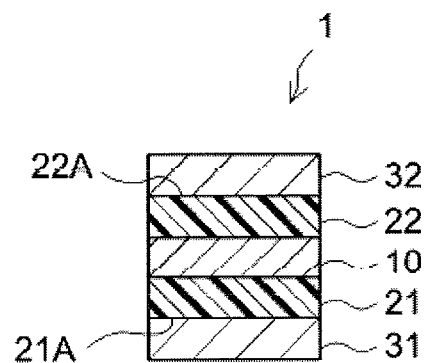
FIG. 1 is a cross-sectional view schematically showing one constitutive example of the pressure-sensitive adhesive sheet of the present invention.
Figure 2:
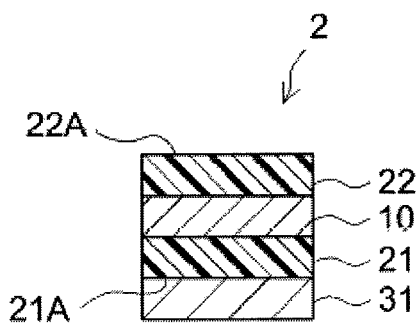
FIG. 2 is a cross-sectional view schematically showing another constitutive example of the pressure-sensitive adhesive sheet of the present invention.

The pressure-sensitive adhesive sheet in the technique disclosed here may have a cross-sectional structure schematically shown by FIG. 1 to FIG. 6. Of those, FIG. 1 and FIG. 2 are constitutive examples of a substrate-attached, double-coated pressure-sensitive adhesive sheet. The pressure-sensitive adhesive sheet 1 shown in FIG. 1 has a constitution in which pressure-sensitive adhesive layers 21 and 22 are provided on both sides (both non-releasable) of a substrate 10, and the surfaces (surfaces to be attached to an adherend under pressure, that is, pressure-sensitive adhesive surfaces) 21A and 22A of the pressure-sensitive adhesive layers 21 and 22 are protected with release liners 31 and 32, respectively, each having a release surface on at least the pressure-sensitive adhesive layer-facing side thereof. The pressure-sensitive adhesive sheet 2 shown in FIG. 2 has a constitution in which pressure-sensitive adhesive layers 21 and 22 are provided on both sides (both non-releasable) of a substrate 10, and the surface (pressure-sensitive adhesive surface) 21A of one pressure-sensitive adhesive layer 21 is protected with a release liner 31 whose surfaces are both releasable. The pressure-sensitive adhesive sheet 2 of such a type can have a constitution where the pressure-sensitive adhesive surface 22A is also protected with the release liner 31 by winding up the pressure-sensitive adhesive sheet 2 in such a manner that the surface (pressure-sensitive adhesive surface) 22A of the other pressure-sensitive adhesive layer 22 is brought into contact with the back of the release liner 31.

Figure 3:
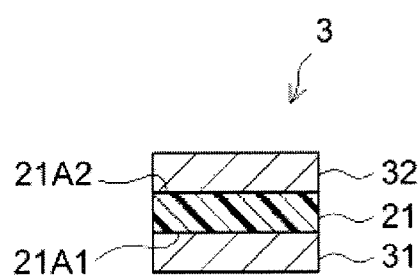
FIG. 3 is a cross-sectional view schematically showing another constitutive example of the pressure-sensitive adhesive sheet of the present invention.
Figure 4:
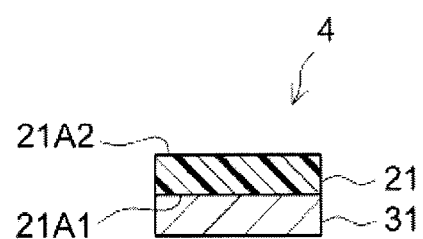
FIG. 4 is a cross-sectional view schematically showing another constitutive example of the pressure-sensitive adhesive sheet of the present invention.

FIG. 3 and FIG. 4 are constitutive examples of a substrate-less double-coated pressure-sensitive adhesive sheet. The pressure-sensitive adhesive sheet 3 shown in FIG. 3 has a constitution in which both surfaces (pressure-sensitive adhesive surfaces) 21A1 and 21A2 of a substrate-less pressure-sensitive adhesive layer 21 are protected with release liners 31 and 32 each of which at least the pressure-sensitive adhesive layer-facing side is a release surface. The pressure-sensitive adhesive sheet 4 shown in FIG. 4 has a constitution in which one surface (pressure-sensitive adhesive surface) 21A1 of a substrate-less pressure-sensitive adhesive layer 21 is protected with a release liner 31 of which both surfaces are release surfaces; and can have a constitution where the other surface (pressure-sensitive adhesive surface) 21A2 is also protected by the release liner 31 by winding this up, to bring the pressure-sensitive adhesive surface 21A2 into contact with the back of the release liner 31.

Figure 5:
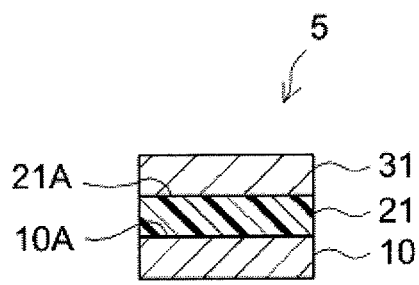
FIG. 5 is a cross-sectional view schematically showing another constitutive example of the pressure-sensitive adhesive sheet of the present invention.
Figure 6:
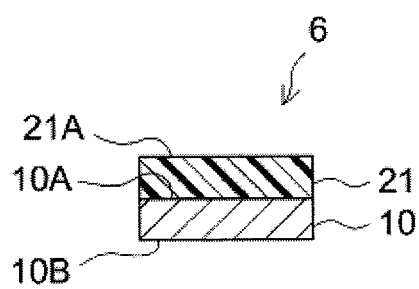
FIG. 6 is a cross-sectional view schematically showing another constitutive example of the pressure-sensitive adhesive sheet of the present invention.

FIG. 5 and FIG. 6 are constitutive examples of a substrate-attached single-coated pressure-sensitive adhesive sheet. The pressure-sensitive adhesive sheet 5 shown in FIG. 5 has a constitution in which a pressure-sensitive adhesive layer 21 is provided on one side 10A (non-releasable) of a substrate 10, and the surface (pressure-sensitive adhesive surface) 21A of the pressure-sensitive adhesive layer 21 is protected with a release liner 31 having a release surface on at least the pressure-sensitive adhesive layer-facing side thereof. The pressure-sensitive adhesive sheet 6 shown in FIG. 6 has a constitution in which a pressure-sensitive adhesive layer 21 is provided on one side 10A (non-releasable) of a substrate 10. The other side 10B of the substrate 10 is a release surface; and when the pressure-sensitive adhesive sheet 6 is wound up, the surface (pressure-sensitive adhesive surface) 21A of the pressure-sensitive adhesive layer 21 is brought into contact with the other side 10B of the substrate 10 so that pressure-sensitive adhesive surface 21A is protected by the other side 10B of the substrate.

The pressure-sensitive adhesive layer in the technique disclosed here has a laminate structure that contains at least one layer LA and at least one layer LB formed of polyester resins $E_A$ and $E_B$, respectively, each having a different weight-average molecular weight (Mw). Typically, the layers LA and LB are layers each comprising the polyester resin $E_A$ or $E_B$, respectively, as the main component thereof (that is, polyester resin layers). The number of the layers constituting the pressure-sensitive adhesive layer (that is, the total of the number of the layer LA and the number of layer LB) is not particularly limited and may be, for example, from 2 to 10. From the viewpoint of the productivity and the like, in general, from 2 to 5 layers are suitable. In such a case, the number of the layer LA constituting the pressure-sensitive adhesive layer may be, for example, from 1 to 3. The number of the layer LB constituting the pressure-sensitive adhesive layer may be, for example, 1 or 2.

The layer LA is one formed by crosslinking a polyester resin $E_A$ having Mw of from $4 \times 10^4$ to $12 \times 10^4$, preferably from $5 \times 10^4$ to $8 \times 10^4$. Typically, the layer may be formed by applying a polyester resin composition CA containing the polyester resin $E_A$ and a crosslinking agent onto a suitable surface followed by crosslinking (curing) the coating. When Mw of the polyester resin $E_A$ is excessively smaller than the above range, the adhesive force may tend to lower. When Mw of the polyester resin $E_A$ is excessively larger than the above range, the crosslinking distance (that is, the distance between crosslinked points) may be too long and the heat resistance retention of the adhesive may tend to lower. If so, in addition, the viscosity of the solution or hot melt of the polyester resin $E_A$ may be high, and the handlability thereof may tend to worsen.

The layer LB is one formed by crosslinking a polyester resin $E_B$ having Mw of from $0.2 \times 10^4$ to $1 \times 10^4$, preferably from $0.3 \times 10^4$ to $0.7 \times 10^4$. Typically, the layer may be formed by applying a polyester resin composition CB containing the polyester resin $E_B$ and a crosslinking agent onto a suitable surface followed by crosslinking (curing) the coating. When Mw of the polyester resin $E_B$ is excessively larger than the above range, the crosslinking distance (that is, the distance between crosslinked points) may be too long and the heat resistance retention of the adhesive may tend to lower. When Mw of the polyester resin $E_B$ is excessively smaller than the above range, the adhesive force may tend to lower depending on the constitution of the pressure-sensitive adhesive layer.

Mw of the polyester resin $E_A$ is preferably larger by at least 5 times than Mw of the polyester resin $E_B$, more preferably by at least 7 times, and even more preferably by at least 9 times. The polyester resins $E_A$ and $E_B$, of which Mw's satisfy the above relation, can more significantly exhibit the effect of the pressure-sensitive adhesive layer having the laminate constitution of the layer LA and the layer LB (typically, the effect of satisfying heat resistance and adhesive force both on high levels). Not specifically defined, in general, Mw of the polyester resin $E_A$ may be suitably larger by at most 50 times than Mw of the polyester resin $E_B$ (typically by at most 40 times, for example, by at most 25 times).

Mw of the polyester resin as referred to herein means a polystyrene-equivalent value as determined by analyzing a sample that is prepared by dissolving the polyester resin in a suitable solvent (for example, tetrahydrofuran), by means of gel permeation chromatography (GPC). Specifically, by performing GPC measurement under the condition shown in Examples given below, Mw of the polyester resin can be determined.

Of the pressure-sensitive adhesive layer in the technique disclosed here, at least one surface is formed of the layer LA. In other words, the layer LA is disposed on at least one side of the above laminate structure. Preferred is a pressure-sensitive adhesive sheet in which the surface formed of the layer LA (that is, the surface of the exposed layer LA) is usable as the pressure-sensitive adhesive surface thereof. Mw of the polyester resin $E_A$ is higher than that of the polyester resin $E_B$, and therefore is suitable for forming a cured product having a long crosslinking distance. Accordingly, the pressure-sensitive adhesive sheet of the constitution where the layer LA formed by crosslinking the polyester resin $E_A$ is exposed out as the pressure-sensitive adhesive surface thereof can exhibit good adhesive force.

In the pressure-sensitive adhesive sheet in which both surfaces of the pressure-sensitive adhesive layer are usable as pressure-sensitive adhesive surfaces (for example, in the substrate-less double-coated pressure-sensitive adhesive sheet), both pressure-sensitive adhesive surfaces may be formed of the first layer LA and the second layer LA, or either one pressure-sensitive adhesive surface may be formed of the layer LA and the other pressure-sensitive adhesive layer may be formed of any other layer (for example, layer LB). In one preferred embodiment, both pressure-sensitive adhesive surfaces are formed of the layer LA (that is, formed of the first layer LA and the second layer LA). The pressure-sensitive adhesive sheet having such a constitution can exhibit good adhesive force on both pressure-sensitive adhesive surfaces thereof. The composition and the gel fraction of the layers LA constituting both pressure-sensitive adhesive surfaces may be the same or different from each other.

In one embodiment of the technique disclosed here, the layer LB is disposed on the back of the layer LA that constitutes the surface of the pressure-sensitive adhesive layer. The polyester resin $E_B$ has a smaller Mw than that of the polyester resin $E_A$, and is therefore suitable for forming a cured product having a short crosslinking distance. Accordingly, by arranging the layer LB formed by crosslinking the polyester resin $E_B$ on the back of the layer LA excellent in adhesive force, a pressure-sensitive adhesive sheet that satisfies adhesive force and heat resistance both on high levels can be realized.

Figure 7:
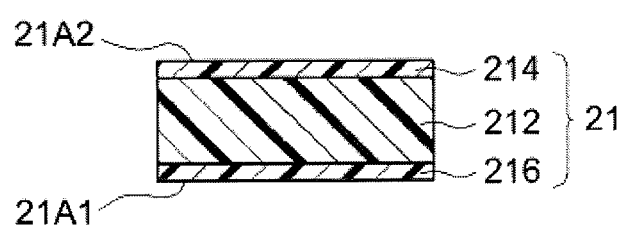
FIG. 7 is a cross-sectional view schematically exemplifying the constitution of the pressure-sensitive adhesive layer of one embodiment.

In the substrate-less double-coated pressure-sensitive adhesive sheet 3 or 4 shown in FIG. 3 or 4 of one embodiment of the pressure-sensitive adhesive sheet disclosed here, the pressure-sensitive adhesive surfaces 21A1 and 21A2 of the pressure-sensitive adhesive layer 21 each are provided by the first layer LA 214 and the second layer LA 216, respectively, as shown in FIG. 7. On the back of the layers LA 214 and 216, disposed is the layer LB 212. In other words, the pressure-sensitive adhesive layer 21 shown in FIG. 7 has a three-layered structure comprising the layers LA 214 and 216 laminated on both surfaces of the layer LB 212.

Figure 8:
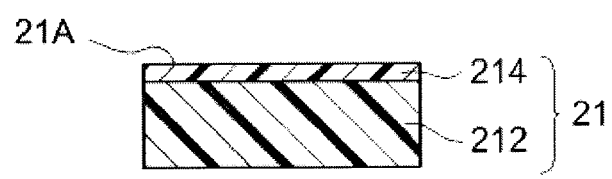
FIG. 8 is a cross-sectional view schematically exemplifying the constitution of the pressure-sensitive adhesive layer of another embodiment.

As for another embodiment of the pressure-sensitive adhesive sheet disclosed here, in the substrate-attached pressure-sensitive adhesive sheet 1, 2, 5 or 6, shown in FIG. 1, 2, 5 or 6, respectively, the pressure-sensitive adhesive surface 21A of the pressure-sensitive adhesive layer 21 is provided by the layer LA 214 and the layer LB 212 is disposed on the back thereof, as shown in FIG. 8. In other words, the pressure-sensitive adhesive layer 21 shown in FIG. 8 has a two-layered structure comprising the layer LB 212 provided on the non-releasable surface of the substrate 10, in which the layer LA 214 is laminated on the layer LB 212.

In one preferred embodiment of the technique disclosed here, the thickness $T_{LA}$ of the layer LA is from 5 μm to 100 μm. Preferably, the thickness $T_{LA}$ of at least the layer constituting the pressure-sensitive adhesive surface falls within the above range. When $T_{LA}$ is smaller than the above range, the adhesive force may tend to be low. When $T_{LA}$ is larger than the above range, the heat resistance (for example, heat resistance retention) may tend to be low. In case where the pressure-sensitive adhesive layer comprises multiple layers LA, the thickness $T_{LA}$ of at least the layer LA constituting the pressure-sensitive adhesive surface preferably falls within the above range. For example, in the pressure-sensitive adhesive layer 21 having a three-layered structure as shown in FIG. 7, the thickness $T_{LA}$'s of the first layer LA 214 and the second layer LA 216 preferably both fall within the above range. From the viewpoint of the heat resistance retention and others, $T_{LA}$ is preferably, for example, from 10 μm to 50 μm, more preferably from 15 μm to 30 μm.

On the other hand, the thickness $T_{LB}$ of the layer LB is preferably from 10 jam to 2000 μm, more preferably from 50 μm to 500 μm or so. When $T_{LB}$ is smaller than the above range, the heat resistance (for example, heat resistance retention) of the pressure-sensitive adhesive sheet may tend to be low. When $T_{LB}$ is larger than the above range, the adhesive force may tend to be low depending on the constitution of the pressure-sensitive adhesive layer (for example, in case where the thickness $T_{LA}$ of the layer LA constituting the pressure-sensitive adhesive surface is relatively small).

The technique disclosed here can be preferably carried out in an embodiment where the thickness $T_{LB}$ of the layer LB laminated on the back of the layer LA constituting the pressure-sensitive adhesive surface is larger than the thickness $T_{LA}$ of the layer LA (that is, $T_{LA}<T_{LB}$). For example, in the three-layered pressure-sensitive adhesive layer 21 shown in FIG. 7, the thickness $T_{LA}$'s of the first layer LA 214 and the second layer LA 216 both are preferably smaller than the thickness $T_{LB}$ of the layer LB 212. This embodiment can more significantly exhibit the effect of the pressure-sensitive adhesive layer having the laminate constitution of the layer LA and the layer LB (typically, the effect of satisfying heat resistance and adhesive force both on high levels). The ratio of $T_{LB}$ to $T_{LA}$ ($T_{LB}/T_{LA}$) is, for example, preferably $1<T_{LB}/T_{LA}\leq 400$, and in general, more preferably $1<T_{LB}/T_{LA}\leq 50$. When $T_{LB}/T_{LA}$ is excessively larger or smaller than the above range, the balance of heat resistance and adhesive force may tend to be lost.

In one preferred embodiment of the technique disclosed here, the gel fraction $G_{LA}$ of the layer LA is from 30 to 65%, more preferably from 40 to 60%. When $G_{LA}$ is excessively larger than the above range, the adhesive force may tend to be low. When $G_{LA}$ is excessively smaller than the above range, the cohesive force may be insufficient and the heat resistance (for example, the heat resistance retention) may tend to be low. In case where the pressure-sensitive adhesive layer comprises multiple layers LA, the gel fraction $G_{LA}$ of at least the layer LA constituting the pressure-sensitive adhesive surface preferably falls within the above range. For example, in the pressure-sensitive adhesive layer 21 having a three-layered structure as shown in FIG. 7, the gel fraction $G_{LA}$'s of the first layer LA 214 and the second layer LA 216 preferably both fall within the above range.

On the other hand, the gel fraction $G_{LB}$ of the layer LB is preferably higher than the gel fraction $G_{LA}$ of the layer LA, and in general, $G_{LB}$ is from 70 to 90%, preferably from 75 to 90%. When $G_{LB}$ is excessively smaller than the above range, then the cohesive force may be insufficient and the heat resistance (for example, heat resistance retention) may tend to be low. When $G_{LB}$ is excessively larger than the above range, the adhesive force may tend to be low depending on the constitution of the pressure-sensitive adhesive layer. The ratio of $G_{LB}$ to $G_{LA}$ ($G_{LB}/G_{LA}$) preferably satisfies, for example, $G_{LB}/G_{LA}>1$, more preferably satisfies $G_{LB}/G_{LA}\geq 1.2$.

The measurement of the gel fraction may be performed according to the method described in Examples described below. As the porous sheet to be used for the measurement, a commercial product by Nitto Denko, "NITOFURON (registered trade name) NTF1122" or its corresponding products is preferably employed.

Typically, the polyester resins $E_A$ and $E_B$ in the technique disclosed here each has a structure formed by condensation of one or two or more compound (that is, polycarboxylic acid component) selected from polycarboxylic acids having at least two carboxyl groups in one molecule and their derivatives with one or two or more compound (that is, polyalcohol component) selected from polyalcohols having at least two hydroxyl groups in one molecule. As the polycarboxylic acid derivatives, use can be made of anhydrides, alkyl esters (including monoesters, diesters and others, and preferably esters with a monoalcohol having from 1 to 3 carbon atoms) or the like of the carboxylic acids.

As the constitutive element of the polycarboxylic acid component, use can be made of one or two or more selected from various known polycarboxylic acids and their derivatives generally used for polyester production. Polycarboxylic acids, which can be used preferably, include aliphatic or alicyclic dibasic acids and their derivatives (hereinafter these may be referred to as "aliphatic or alicyclic dicarboxylic acids"). Specific examples thereof include adipic acid, azelaic acid, dimer acid, sebacic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, dodecenylsuccinic anhydride, fumaric acid, succinic acid, dodecanedioic acid, hexahydrophthalic anhydride, tetrahydrophthalic anhydride, maleic acid, maleic anhydride, itaconic acid, and citraconic acid.

From the viewpoint of less environmental load, materials not depending on petroleum (that is, non-petroleum materials), especially plant-derived materials are preferably employed as the constitutive element of the polycarboxylic acid component. This is advantageous in point of biomass degree improvement. As the plant-derived materials, dimer acid and sebacic acid are exemplified. "Dimer acid" as referred to herein means a dicarboxylic acid having a structure where unsaturated fatty acids are dimerized. Dicarboxylic acids having 36 carbon atoms and having a structure where unsaturated fatty acids (oleic acid, linolic acid, linoleic acid, etc.) having 18 carbon atoms are dimerized are typical examples falling within the scope of the dimer acid.

Other examples of the compound capable of being used as a constitutive element of the above polycarboxylic acid component include aromatic dibasic acids and their derivatives (anhydrides, alkyl esters, etc. these may be hereinafter referred to as "aromatic dicarboxylic acids"). Specific examples of the aromatic dibasic acids include terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenylether-dicarboxylic acid.

The polycarboxylic acid component in the technique disclosed here, for example, may only contain one or two or more of compound that belongs to the aliphatic or alicyclic dicarboxylic acids, or may only contain one or two or more of compound that belongs to the aromatic dicarboxylic acids, or may contain both the aliphatic or alicyclic dicarboxylic acid and the aromatic dicarboxylic acid. In the technique disclosed here, use of the aliphatic or alicyclic dicarboxylic acids alone (for example, aliphatic dicarboxylic acids alone) as the polycarboxylic acid component can realize excellent results. As the case may be, the aliphatic or alicyclic dicarboxylic acids may be used as a main component (the component accounting for at least 50% by mass of the polycarboxylic acid component) and the aromatic dicarboxylic acids may be used in combination thereto in a degree not to significantly deteriorate the properties of the composition.

As the constitutive element of the polyalcohol component, use can be made of one or two or more selected from various known polyalcohols generally used for production of polyesters. Polyalcohols, which can be used preferably, include aliphatic or alicyclic diols. Specific examples thereof include ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentylglycol, diethylene glycol, dipropylene glycol, 2,2,4-trimethyl-1,5-pentanediol, 2-ethyl-2-butylpropanediol, 1,9-nonanediol, 2-methyloctanediol, and 1,10-decanediol.

From the viewpoint of less environmental load, non-petroleum materials, especially plant-derived materials are preferably employed as the constitutive element of the polyalcohol component. As the plant-derived materials dimer diol and 1,4-butanediol are exemplified. "Dimer diol" as referred to herein means a diol having a structure where carboxyl groups in a dicarboxylic acid of dimerized unsaturated fatty acids are converted into a hydroxyl group. Diols having 36 carbon atoms and corresponding to the dimers of unsaturated fatty acids (oleic acid, linolic acid, linoleic acid, etc.) having 18 carbon atoms are typical examples falling within the scope of the dimer diol.

As the polyester resins $E_A$ and $E_B$, those not having any other crosslinkable functional groups than the functional groups at both ends (typically either of hydroxyl group and carboxyl group) are preferably used. The polyester resin to be produced by polycondensation of a dimer acid with a dimer diol is one preferred example that falls within the scope of the polyester having such a structure. The polyester resins $E_A$ and $E_B$ having such a structure are preferred since gel fractions thereof after crosslinking are easily controllable based on Mw's (further, preferably, acid values) of the polyester resins.

In one preferred embodiment, the combination of the polycarboxylic acid component and the polyalcohol component constituting the polyester resin $E_A$ (this means the combination of the kind of the compounds irrespective of the blend ratio of the compounds) is the same as the combination of the polycarboxylic acid component and the polyalcohol component constituting the polyester resin $E_B$. The polyester resins $E_A$ and $E_B$ having the relation as above may readily form a pressure-sensitive adhesive layer excellent in the adhesiveness (interlayer adhesion strength) of the layer LA and the layer LB. Accordingly, a pressure-sensitive adhesive sheet having more uniform and more stable adhesive properties (heat resistance retention, adhesive force, etc.), and a pressure-sensitive adhesive sheet having a pressure-sensitive adhesive layer more excellent in transparency can be realized.

In another preferred embodiment, at least 50% by mass, more preferably at least 75% by mass, and even more preferably at least 90% by mass of the polycarboxylic acid component or the polyalcohol component constituting the polyester resin $E_A$ is the same compound as the polycarboxylic acid component or the polyalcohol constituting the polyester resin $E_B$. Substantially all (that is, substantially 100% by mass) of the polycarboxylic acid component or the polyalcohol component constituting the polyester resin $E_A$ may be the same compound as the polycarboxylic acid component or the polyalcohol constituting the polyester resin $E_B$. At least 50% by mass, preferably at least 75% by mass, more preferably at least 90% by mass, and most preferably 100% by mass of each of the polycarboxylic acid component and the polyalcohol component constituting the polyester resin $E_A$ are the same compounds as the polycarboxylic acid component and the polyalcohol constituting the polyester resin $E_B$, respectively. The polyester resins $E_A$ and $E_B$ having the relation as above may readily form a pressure-sensitive adhesive layer excellent in the adhesiveness of the layer LA and the layer LB. Accordingly, a pressure-sensitive adhesive sheet having more uniform and more stable adhesive properties (heat resistance retention, adhesive force, etc.), and a pressure-sensitive adhesive sheet having a pressure-sensitive adhesive layer more excellent in transparency can be realized.

The polyester resins $E_A$ and $E_B$ in the technique disclosed here may be prepared by polycondensation of a polycarboxylic acid component with a polyalcohol component, like ordinary polyester resins. More specifically, the condensation reaction of the carboxyl group provided from the polycarboxylic acid component with the hydroxyl group provided from the polyalcohol component is effected typically with removing water formed by the condensation reaction (condensation water) out of the reaction system, whereby the polyester resins $E_A$ and $E_B$ can be produced (synthesized). As a method for removing the condensation water out of the reaction system, use can be made of a method of blowing an inert gas into the reaction system to take the condensation water out of the reaction system along with the inert gas, a method of distilling the condensation water away out of the reaction system under reduced pressure (reduced pressure method) or the like. The reduced pressure method is preferably employed since the polymerization time may be readily shortened and therefore it is suitable for improving the productivity.

The reaction temperature in the condensation reaction and the degree of pressure reduction (pressure in the reaction system) in the case of employing the reduced pressure method may be suitably set so that the polyester resin having the intended properties (Mw, etc.) can be efficiently obtained. Not particularly limited, in general, the reaction temperature is suitably set to from 180° C. to 260° C., and can be set to, for example, from 200° C. to 220° C. When the reaction temperature is excessively lower than the above range, the polymerization speed may be low and the productivity may be impaired. On the other hand, when the reaction temperature is excessively higher than the above range, the formed polyester resin may be deteriorated. Also not particularly limited, in general, the degree of pressure reduction is suitably set to at most 10 kPa (typically from 10 kPa to 0.1 kPa), and can be set to, for example, from 4 kPa to 1 kPa. When the pressure in the reaction system is excessively high, the water formed by condensation reaction may be difficult to efficiently be distilled away out of the system, and the polymerization speed may be low. In case where the reaction temperature is relatively high, when the pressure in the reaction system is set to excessively low, even polycarboxylic acid and polyalcohol, which are the starting materials, may also be distilled away out of the system, which requires special attention. When the pressure in the reaction system is set to excessively low, the pressure would be difficult to attain and maintain, and therefore, in general, the pressure in the reaction system is preferably set to at least 0.1 kPa.

In the polycondensation reaction, a known or ordinary polymerization catalyst may be used like in the case of ordinary polyester resins. Examples of the polymerization catalyst include various metal compounds such as titanium-based, germanium-based, antimony-based, tin-based, and zinc-based; and strong acids such as p-toluenesulfonic acid and sulfuric acid. Above all, preferred is use of titanium-based metal compounds (titanium compounds). Specific examples of the titanium compounds include titanium tetraalkoxides such as titanium tetrabutoxide, titanium tetraisopropoxide, titanium tetrapropoxide, and titanium tetraethoxide; octa-alkyl trititanate, hexa-alkyl dititanate, alkyl titanates, and titanium acetate.

In the technique disclosed here, typically, the layers LA and LB constituting the pressure-sensitive adhesive layer are formed of polyester resin compositions CA and CB each containing the polyester resin $E_A$ or $E_B$ and, in addition, a crosslinking agent. The type of the crosslinking agent is not particularly limited, and the agent may be suitably selected from any conventionally known crosslinking agents. For example, use can be made of polyfunctional isocyanates (compounds having, on average, at least 2 isocyanate groups per molecule, and including those having an isocyanurate structure), polyfunctional melamine compounds (methylated methylolmelamine, butylated hexamethylolmelamine, etc.), polyfunctional epoxy compounds (diglycidylaniline, glycerin diglycidyl ether, etc.), polyfunctional oxazoline compounds, polyfunctional aziridine compounds, metal chelate compounds, etc. From the viewpoint of easily realizing the preferred gel fraction disclosed here, a polyfunctional isocyanate (for example, polyfunctional isocyanate having isocyanurate structure) can be preferably employed as the crosslinking agent. Use of such polyfunctional isocyanates is preferred from the viewpoint of the easiness in producing a pressure-sensitive adhesive having high transparency.

As the polyfunctional isocyanate, use can be made of one or two or more selected from various isocyanate compounds (polyisocyanates) each having at least two isocyanate groups in one molecule. Examples of the polyfunctional isocyanates include aliphatic polyisocyanates, alicyclic polyisocyanates, and aromatic polyisocyanates.

Specific examples of the aliphatic polyisocyanates include 1,2-ethylene diisocyanate; tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; 2-methyl-1,5-pentane diisocyanate, 3-methyl-1,5-pentane diisocyanate, and lysine diisocyanate.

Specific examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Specific examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

As crosslinking agents preferred for the present invention, there are exemplified polyfunctional isocyanates having, on average, at least three isocyanate groups per molecule. Such tri- or more-functional isocyanates may be multimers (typically dimers or trimers) of difunctional or tri- or more-functional isocyanates, derivatives thereof (for example, addition reaction products of a polyalcohol with two or more molecules of polyfunctional isocyanates), polymers thereof, etc. Examples thereof include dimers and trimers of diphenylmethane diisocyanate, isocyanurates of hexamethylene diisocyanate (trimer adducts having isocyanurate structure), reaction products of trimethylolpropane with tolylene diisocyanate, and reaction products of trimethylolpropane with hexamethylene diisocyanate, as well as polyfunctional isocyanates such as polymethylene polyphenyl isocyanate, polyether polyisocyanate, and polyester polyisocyanate. Use of such a tri- or more-functional polyisocyanate as the crosslinking agent may exhibit better cohesive force and may attain crosslinking stabilization, therefore can more surely (for example, stably with preventing the risk of gel fraction insufficiency) realize the preferred gel fraction disclosed here. Use of such a polyfunctional isocyanate is also preferred from the viewpoint of easiness in obtaining a pressure-sensitive adhesive of high transparency. Especially preferred are isocyanurates of di- or more-functional isocyanates (for example, hexamethylene diisocyanate).

Commercial products of polyfunctional isocyanates usable as the crosslinking agent in the technique disclosed here, include trade name "DURANATE TPA-100" manufactured by Asahi Kasei Chemicals; and trade names "CORONATE L", "CORONATE HL", "CORONATE HK", "CORONATE HX", "CORONATE 2096", manufactured by Nippon Polyurethane Industry.

Such crosslinking agents may be used here either alone or in combination of two or more thereof. The amount of the crosslinking agent to be used (in case where multiple crosslinking agents are used together, their total amount) relative to 100 parts by mass of the polyester resin may be, in general, suitably at most 20 parts by mass (typically from 0.001 to 20 parts by mass), preferably at most 15 parts by mass, and more preferably at most 10 parts by mass. When the amount of the crosslinking agent is excessively large, the adhesive force of the adhesive obtained after crosslinking may tend to be low. In general, the amount of the crosslinking agent to be used relative to 100 parts by mass of the polyester resin is suitably at least 0.01 parts by mass, preferably at least 0.1 parts by mass, and more preferably at least 1 part by mass. When the amount of the crosslinking agent is excessively small, the cohesive force of the adhesive may be insufficient and the heat resistance retention thereof may tend to be low. In case where a polyfunctional isocyanate (typically tri- or more-functional isocyanate) is used as the crosslinking agent, the above amount is especially preferably applied. The type and the amount of the crosslinking agents to be used for crosslinking the polyester resins $E_A$ and $E_B$ may be the same or different.

The polyester resin compositions CA and CB for use in forming the layers LA and LB may contain, in addition to the above crosslinking agent (for example, polyfunctional isocyanate), a crosslinking catalyst capable of promoting the crosslinking reaction of the crosslinking agent. Examples of the crosslinking catalyst include organic metal compounds such as tetraisopropyl titanate, tetra-n-butyl titanate, tin octylate, lead octylate, cobalt octylate, zinc octylate, calcium octylate, lead naphthenate, cobalt naphthenate, dibutyltin diacetate, dibutyltin dioctate, dibutyltin dilaurate, and dibutyltin maleate; basic compounds such as butylamine, dibutylamine, hexylamine, t-butylamine, ethylenediamine, isophoronediamine, imidazole, lithium hydroxide, potassium hydroxide, and sodium methylate; and acidic compounds such as p-toluenesulfonic acid, trichloroacetic acid, phosphoric acid, monoalkyl phosphate, dialkyl phosphate, β-hydroxyethyl acrylate phosphate, monoalkyl phosphite, and dialkyl phosphite. Such crosslinking catalysts may be used either alone or in combination of two or more thereof, arbitrarily. The type and the amount of the crosslinking aid (that is, crosslinking catalyst) for use for crosslinking the polyester resins $E_A$ and $E_B$ may be the same or different. The crosslinking aid may be used in only one of the layers LA and LB or both of the two.

The acid value of the polyester resin $E_A$ is preferably at most 7 mg KOH/g (typically from 0 to 7 mg KOH/g), more preferably at most 3 mg KOH/g, even more preferably at most 1 mg KOH/g, and most preferably at most 0.5 mg KOH/g. The acid value of the polyester resin $E_B$ is preferably at most 3 mg KOH/g (typically from 0 to 3 mg KOH/g), more preferably at most 1 mg KOH/g, even more preferably at most 0.5 mg KOH/g, and most preferably at most 0.2 mg KOH/g. When the acid value of any of the polyester resins $E_A$ and $E_B$ is excessively larger than the above range, the layers LA or LB having the preferred gel fraction disclosed here may be difficult to form. In the adhesive composition containing a crosslinking agent of a type that utilizes the crosslinking reaction of an isocyanate group, use of the polyester resins $E_A$ and $E_B$ satisfying the above acid value is especially effective. In one preferred embodiment of the technique disclosed here, the acid values of the polyester resins $E_A$ and $E_B$ both are at most 1 mg KOH/g, more preferably at most 0.5 mg KOH/g, and even more preferably at most 0.2 mg KOH/g. The pressure-sensitive adhesive layer having the constitution hardly corrodes metal since the acid group content therein is low. The pressure-sensitive adhesive sheet having such a pressure-sensitive adhesive layer is favorable, for example, for a pressure-sensitive adhesive sheet for use for direct application to a metal surface (for example, for a pressure-sensitive adhesive sheet for use for bonding electronic parts).

The acid value may be determined as follows: the polyester resin to be analyzed is dissolved in a suitable solvent including water (preferably a good solvent for the polyester resin, which is an object to be analyzed, and in general, a mixed solvent of water and an organic solvent is used), to have a concentration of from 0.5 to 2% by mass or so therein, thereby preparing a sample solution for titration; and the solution is titrated for neutralization with a KOH solution of from about 0.05 to 0.5 normal (in which water or a mixed solvent of water and an organic solvent is used as the solvent).

The layer LA may contain a polyester resin $E_C$ not belonging to the polyester resin $E_A$ (this may be a polyester resin belonging to the polyester resin $E_B$, or may be a polyester resin not belonging to any of the polyester resins $E_A$ and $E_B$) as long as it does not significantly detract from the effect of the present invention. In general, the content of the polyester resin $E_C$ (in case where two or more resins are contained, their total amount) is suitably at most 25% by mass, preferably at most 10% by mass, relative to the sum total, 100% by mass, of all the polyester resins contained in the layer LA. The content of the polyester resin $E_C$ may be 5% by mass, and the layer LA may be a layer not substantially containing the polyester resin $E_C$ (that is, a layer in which the polyester resin is substantially composed of the polyester $E_A$ alone).

The layer LB may contain a polyester resin $E_D$ not belonging to the polyester resin $E_B$ (this may be a polyester resin belonging to the polyester resin $E_A$, or may be a polyester resin not belonging to any of the polyester resins $E_A$ and $E_B$) as long as it does not significantly detract from the effect of the present invention. In general, the content of the polyester resin $E_D$ (in case where two or more resins are contained, their total amount) is suitably at most 25% by mass, preferably at most 10% by mass, relative to the sum total, 100% by mass, of all the polyester resins contained in the layer LB. The content of the polyester resin $E_D$ may be 5% by mass, and the layer LB may be a layer not substantially containing the polyester resin $E_D$ (that is, a layer in which the polyester resin is substantially composed of the polyester $E_B$ alone).

The pressure-sensitive adhesive layer in the technique disclosed here may contain a polymer component (polymer P) other than the polyester resin as long as it does not significantly detract from the effect of the present invention. Examples of the polymer component include acrylic polymer, natural rubber-type polymer, synthetic rubber-type polymer, and silicone-based polymer. The polymer component excellent in compatibility with the polyester resin is preferably selected. Such a polymer component may be contained in any of the layers LA and LB, or may be contained in the pressure-sensitive adhesive layer as another layer than the layers LA and LB. Specifically, the pressure-sensitive adhesive layer in the technique disclosed here may have a laminate structure containing the layers LA and LB and further any other layer than these layers. In general, preferred is the pressure-sensitive adhesive layer having a laminate structure of the layers LA and LB alone. In general, the content of the polymer P used is suitably at most 25% by mass, preferably at most 10% by mass, relative to 100% by mass of the polymer components contained in the entire pressure-sensitive adhesive layer (total of the polyester resin and the polymer P). The content of the polymer P may be 5% by mass, and the pressure-sensitive adhesive layer may be a layer substantially not containing the polymer P (that is, a layer in which the polymer component is substantially composed of polyester resin alone).

If desired, the pressure-sensitive adhesive layer in the technique disclosed here may contain a tackifying resin. Such a tackifying resin may be contained in one of the layers LA and LB, or may be contained in both of them. For example, preferably employed here is an embodiment where the layer LA (especially the layer LA constituting the pressure-sensitive adhesive surface) contains a tackifying resin, and the other layer does not contain the tackifying resin.

Any conventionally known tackifying agent can be used with no particular limitation. Examples thereof include terpene-type tackifying resins, phenolic tackifying resins, rosin-type tackifying resins, aliphatic petroleum resins, aromatic petroleum resins, copolymer-type petroleum resins, alicyclic petroleum resins, xylene resins, epoxy-type tackifying resins, polyamide-type tackifying resins, ketone-type tackifying resins, and elastomer-type tackifying resins. Such tackifying resins may be used either alone or in combination of two or more thereof. From the viewpoint of biomass degree improvement, tackifying resins produced from plant-derived materials (for example, plant-derived rosin-type tackifying resins, terpene-type tackifying resins) is particularly preferably employed.

In case where one or both of the layers LA and LB (typically the layer LA alone) contain a tackifying resin, its amount (content) used is suitably at most 100 parts by mass (typically from 0.1 to 100 parts by mass), preferably at most 50 parts by mass and more preferably at most 30 parts by mass, relative to 100 parts by mass of the polyester resin contained in the layer. The amount may be at most 10 parts by mass, or may be at most 5 parts by mass. The lowermost limit of the amount of the tackifying resin used is not particularly limited, and in general, the amount is suitably at least 0.1 parts by mass, preferably at least 1 part by mass, relative to 100 parts by mass of the polyester resin contained in the layer. When the amount thereof used is excessively small, the tackifying resin could not sufficiently exhibit its effect. When the amount used is excessively large, the crosslinking reaction may be retarded and the desired gel fraction may be difficult to realize, and in addition, the compatibility with polyester resin may be insufficient and the adhesive force may tend to be low.

In an embodiment of using a tackifying agent, the tackifying agent to be used is preferably one having a softening point of not lower than 40° C., more preferably not lower than 60° C., and even more preferably not lower than 80° C., from the viewpoint of obtaining a pressure-sensitive adhesive having better heat resistance retention. The uppermost limit of the softening point of the tackifying resin is not particularly limited, but in general, from the viewpoint of easy availability and compatibility thereof with polyester resin, preferred is use of a tackifying resin having a softening point of not higher than 130° C. As the case may be, use of the tackifying resin may be omitted. One preferred embodiment of the technique disclosed here is a pressure-sensitive adhesive sheet provided with a pressure-sensitive adhesive layer substantially not containing a tackifying resin.

Each layers constituting the pressure-sensitive adhesive layer disclosed here may contain, if desired, ordinary additives such as UV absorbent, light stabilizer, release regulator, plasticizer, softener, filler, colorant (pigment, dye, etc.), antiaging agent, and surfactant, within the range not significantly detracting from the effect of the present invention.

The thickness of the pressure-sensitive adhesive layer is not particularly limited, and may be suitably set in accordance with, for example, the use of the pressure-sensitive adhesive sheet. For example, the thickness of the pressure-sensitive adhesive layer may be set to from 15 µm to 2100 µm or so, preferably from 15 µm to 1000 µm, more preferably from 20 µm to 500 µm or so, and even more preferably from 50 µm to 200 µm or so.

In case where the pressure-sensitive adhesive sheet disclosed here is provided with a substrate to support (line) the pressure-sensitive adhesive layer thereof, any conventionally known one may be used as the substrate. For example, use can be made of papers such as Japanese paper, kraft paper, glassine paper, high-quality paper, synthetic paper, and topcoated paper; fabrics such as woven fabrics or nonwoven fabrics of simple of blended fibrous materials (including natural fibers, semisynthetic fibers, and synthetic fibers) of, for example, cotton fibers, staple fibers, Manila fibers, pulp, rayon, acetate fibers, polyester fibers, polyvinyl alcohol fibers, polyamide fibers (nylon fibers), polyolefin fibers (polypropylene fibers, polyethylene fibers, etc.), and acrylic fibers; plastic substrates such as plastic films, porous plastic sheets or the like formed of various plastic materials such as polyolefins (low-density polyethylene, middle-density polyethylene, high-density polyethylene, linear low-density polyethylene, ethylene-α-olefin copolymer, ethylene-vinyl acetate copolymer, ethylene-ethyl acrylate copolymer, ethylene-methyl methacrylate copolymer, ethylene-n-butyl acrylate copolymer, propylene homopolymer, propylene random copolymer, propylene block copolymer, etc.), polyesters (polyethylene terephthalate, etc.), polyurethanes, vinyl chloride-based resins, vinyl acetate-based resins, polyimide-based resins, polyamide-based resins, fluororesins, and cellophanes; rubber sheets formed of natural rubber, butyl rubber, etc.; foam sheets formed of foams such as foam polyurethane, and foam polychloroprene rubber; metal foils such as aluminium foil and copper foil; their composites, etc. The plastic films may be unstretched or stretched (mono-stretched or bi-stretched) ones. In case where the above porous plastic sheets or nonwoven fabrics are used as the substrate, a non-porous substrate such as a plastic film or sheet may be laminated on one side (typically on the side opposite to the side on which the pressure-sensitive adhesive layer is to be formed, that is, on the back) thereof.

The substrate may contain, if desired, various additives generally usable in ordinary substrates (supports) for a pressure-sensitive adhesive tape, such as filler (inorganic filler, organic filler, etc.), antiaging agent, antioxidant, UV absorbent, light stabilizer, antistatic agent, lubricant, plasticizer, and colorant (pigment, dye, etc.). The surface of the substrate (especially the surface on the side on which the pressure-sensitive adhesive layer is to be formed) may be subjected to an ordinary surface treatment useful for enhancing anchoring ability of the pressure-sensitive adhesive layer to the substrate, for example, an oxidation treatment by chemical or physical process of chromate treatment, ozone exposure, flame exposure, high-pressure shock exposure, ionizing radiation treatment or the like; or a coating treatment by an undercoat agent, or the like. For imparting releasability to the pressure-sensitive adhesive layer, for example, the substrate may be subjected to a coating treatment (release treatment) by a release agent such as a silicone resin or a fluororesin, or the like.

The thickness of the substrate (support) may be suitably selected depending on the material or the form thereof, and may be, for example, from 1 μm to 1000 μm or so. In general, the thickness of the substrate is preferably from 2 μm to 500 μm, more preferably from 3 μm to 300 μm, further preferably from 5 μm to 250 μm, and particularly preferably from 10 μm to 200 μm.

The pressure-sensitive adhesive layer having the laminate structure disclosed here may be favorably formed, for example, by previously forming the each layers constituting the pressure-sensitive adhesive layer (typically, at least one layer containing the polyester resin $E_A$ and at least one layer containing the polyester resin $E_B$), followed by laminating (attaching) the layers together. The time when the polyester resins $E_A$ and $E_B$ are crosslinked may be before the lamination or after the lamination, or may be a period including before lamination and after lamination. Accordingly, the matters disclosed in this description include a method for producing a pressure-sensitive adhesive sheet provided with a pressure-sensitive adhesive layer having a laminate constitution of a layer LA and a layer LB, and the production method comprises: applying a composition CA containing a polyester resin $E_A$ onto a releasable substrate surface; applying a composition CB containing a polyester resin $E_B$ onto a releasable or non-releasable substrate surface; attaching the compositions CA and CB each applied on the substrate surface with each other; effecting crosslinking of the above $E_A$ after the application to the substrate and before and/or after the attaching, to form a layer LA; and effecting crosslinking of the above $E_B$ after the application to the substrate and before and/or after the attaching, to form a layer LB. Typically, the compositions CA and CB further contain a crosslinking agent.

Another method of forming the pressure-sensitive adhesive layer having a laminate structure include a method comprising directly applying the composition for forming the constitutive layer onto a surface of the other layer, optionally drying it, and then effecting crosslinking of it. These methods may be use in combination thereof.

In forming the constitutive layers of the pressure-sensitive adhesive layer, preferably, a solution or dispersion (typically emulsion) containing the components corresponding to the layer in a suitable solvent, or a hot melt of the components corresponding to the layer may be applied onto a surface of a releasable or non-releasable support or onto a surface of any other layer. For the coating, use can be made of any conventionally known coater such as a gravure coater, a reverse roll coater, a kiss roll coater, a dip roll coater, a bar coater, a knife coater, and a spray coater.

As the release liner, any conventionally known ones can be used without particular limitation. A release liner having a constitution where a surface of a substrate has been subjected to release treatment is preferably employed. As the substrate (substrate for release liner) to constitute the release liner of this type, various plastic films (for example, plastic films made from thermoplastic resins of, for example, polyesters such as polyethylene terephthalate; polyolefins such as polypropylene and ethylene-propylene copolymer; and polyvinyl chloride), papers, fabrics, rubber sheets, foam sheets, metal foils, their composites (for example, laminate-structured sheets of paper laminated with olefin resin on both sides thereof), etc., can be selectively employed. The release treatment may be effected according to ordinary methods by using conventionally known or ordinary release agents (for example, silicone-based, fluorine-based or long-chain alkyl-based release agents). As the case may be, low-adhesive substrates of, for example, olefinic resins (for example, polyethylene, polypropylene, ethylene-propylene copolymer, polyethylene/polypropylene mixture), fluorine-based polymers (for example, polytetrafluoroethylene, polyvinylidene fluoride) or the like, may be used as a release liner without subjected to any release treatments on the surface thereof. Also, such low-adhesive substrates may be used after subjected to a release treatment. The structure of the substrate for release liner may be a single layer structure, or a laminate-structure of multiple layers. The thickness of the substrate for release liner may be suitably selected depending on the object thereof.

In one preferred embodiment of the pressure-sensitive adhesive sheet disclosed here, the SUS-adhering force thereof, as measured under the condition described in Examples given below, is at least 10 N/20 mm and more preferably at least 15 N/20 mm, and the heat resistance retention thereof is not lower than 100° C., preferably not lower than 120° C. and further preferable not lower than 140° C. The pressure-sensitive adhesive sheet capable of realizing adhesive force and heat resistance retention both on high levels as above, is favorably used in various fields.

In carrying out the present invention, it would be unnecessary to clarify the reason why the object of the present application can be attained by the above constitution; however, the followings may be taken into consideration. That is, in an ordinary adhesive, when the molecular weight of the polymer constituting the adhesive increases, the cohesive force thereof tends to increase. However, in general, a polyester-based adhesive is so designed that it can exhibit the desired cohesive force (relating to heat resistance such as heat resistance retention) by effecting a reaction of functional groups (typically hydroxyl group and/or carboxyl group) at both ends of the polyester with a crosslinking agent, and therefore, when a polyester resin having a higher molecular weight is used, the crosslinking distance may be long and heat resistance may thereby tend to be impaired. When a polyester resin having a lower molecular weight is used, the crosslinking distance may be short and adhesive force may thereby tend to be low. Accordingly, heat resistance and adhesive force are in a contradictory relation to each other, and therefore, even when it is desired to take a balance between the heat resistance and the adhesive force by merely controlling the molecular weight of the polyester resin and the degree of crosslinking (gel fraction) thereof, it is difficult to satisfy the two characteristics both on high levels. The pressure-sensitive adhesive sheet of the present invention is provided with a pressure-sensitive adhesive layer that has a laminate structure of layers LA and LB formed by crosslinking polyester resins $E_A$ and $E_B$, respectively, each having different Mw, and the sheet has a structure where the layer LA is exposed out on at least one surface (pressure-sensitive adhesive surface) of the pressure-sensitive adhesive layer. It may be considered that, thanks to the synergistic effect obtained by combining the layer LA (a layer emphasizing adhesive force) having a long crosslinking distance and the layer LB (a layer emphasizing heat resistance (heat resistance retention)) having a short crosslinking distance and construction where at least one pressure-sensitive adhesive surface is formed of the layer LA, the constitution as above could have realized the pressure-sensitive adhesive sheet that satisfies heat resistance and adhesive force both on high levels.

EXAMPLES

Some experimental examples relating to the present invention are described below, but these are not intended to restrict the present invention to such concrete examples. Unless otherwise specifically indicated, "part" and "%" in the following description are all by mass. The properties in the following description were measured or evaluated according to the following methods.

[Weight-Average Molecular Weight (Mw)]

For each polyester shown in table 1, 0.01 g (solid content basis) thereof was weighed, added to 10 g of tetrahydrofuran (THF), then allowed to stand for 24 hours and dissolved. The THF solution was analyzed for GPC by means of GPC apparatus, Model "HLC-8120GPC", manufactured by TOSOH under the condition mentioned below, thereby measuring the polystyrene-equivalent weight-average molecular weight (Mw) of the polyester.

GPC Condition:
Column: TSKgel G6000H6, manufactured by TOSOH
Column size: inner diameter 7.5 mm×length 30.0 cm
Eluent: tetrahydrofuran
Flow rate: 0.300 mL/min
Column temperature: 40° C.
Detector: RI (differential refractometer)
Sample amount: 20 μL

[Gel Fraction]

The pressure-sensitive adhesive sheet of respective example was cut into a size of 5 cm×5 cm along with the polyethylene terephthalate (PET) film. Only the pressure-sensitive adhesive layer (crosslinked adhesive sample) was taken out of it, wrapped with a tetrafluoroethylene resin-made porous sheet (average pore size 0.2 μm, thickness 0.2 mm) as cut in a suitable size (weight $W_a$ mg), and the weight of the obtained pack ($W_b$ mg) was measured. The pack was dipped in toluene and allowed to stand at 23° C. for 7 days, thereby extracting the toluene-soluble fraction from the crosslinked adhesive sample. Subsequently, the pack was picked up from toluene, dried at 120° C. for 2 hours, and the weight of the thus-dried, pack ($W_c$ mg) was measured. Each value was introduced into the following formula:

$$\text{Gel Fraction [\%]}=(W_c-W_a)/(W_b-W_a)\times 100,$$

whereby the gel fraction of the crosslinked adhesive was calculated. The tetrafluoroethylene resin-made porous sheet used above was trade name "NITOFURON (registered trade name) NTF1122", manufactured by Nitto Denko.

[Adhesive Force]

From the pressure-sensitive adhesive sheet of respective example, the PET film covering one side of the pressure-sensitive adhesive layer was removed to expose the pressure-sensitive adhesive surface. A PET film having a thickness of 25 μm, of which the surface had been subjected to corona-treatment, was attached to the pressure-sensitive adhesive surface for lining. The thus-lined pressure-sensitive adhesive sheet was cut into a strip having a width of 20 mm along with the PET film covering the other side of the pressure-sensitive adhesive layer, to thereby prepare a specimen. The PET film covering the other side of the pressure-sensitive adhesive layer was removed from the specimen, and the exposed pressure-sensitive adhesive surface was adhered to a SU5304 stainless plate (adherend) under pressure by one back-and-forth rolling with a 2-kg roller thereon. In 30 minutes after the adhering (pressure-bonding), adhesive force (N/20 mm width) of the specimen to SUS was measured in accordance with JIS C 2107, in the condition under an environment at a temperature of 23° C. and a relative humidity of 50%, using a tensile tester, at a pulling rate of 300 mm/min, and at a pulling angle of 180° (180-degree peeling method).

[Heat Resistance Retention]

From the pressure-sensitive adhesive sheet of respective example, the PET film covering one side of the pressure-sensitive adhesive layer was removed to expose the pressure-sensitive adhesive surface. An aluminum sheet having a thickness of 90 μm was attached to the pressure-sensitive adhesive surface for lining. The thus-lined pressure-sensitive adhesive sheet was cut into a size having a width of 10 mm and a length of 100 mm along with the PET film covering the other side of the pressure-sensitive adhesive layer, to thereby prepare three specimens from each example (that is, n=3). From the specimen, the PET film covering the other side of the pressure-sensitive adhesive layer was removed, and the thus-exposed pressure-sensitive adhesive surface was attached to a Bakelite plate (width 25 mm, length 125 mm, thickness 2 mm) as an adherend, in a contact area of 10 mm width×20 mm length, under pressure by one back-and-forth rolling with a 5-kg roller thereon. The specimen thus attached to the adherend was allowed to stand in a predetermined temperature condition for 30 minutes, then a load of 500 g was given to the free end of the specimen, and while given the load, the specimen was left in the same temperature condition for 1 hour. The test temperature was elevated from 40° C. at intervals of 10° C., and the highest temperature at which all the three specimens in each example were kept attached to the adherend for 1 hour was taken as the heat resistance retention temperature of the pressure-sensitive adhesive sheet of the respective example.

<Synthesis of Polyester Resin A-1>

Into a reaction vessel equipped with a stirrer, a thermometer and an outflow condenser were charged 100 parts of a dimer diol (trade name, PRIPOL 2033, Mw 534, manufactured by Croda Japan), 99.1 parts of a dimer acid (trade name, PRIPOL 1009, Mw 566, manufactured by Croda Japan), and 0.5 parts of titanium tetraisopropoxide (manufactured by Wako Pure Chemicals, this is expressed as "Ti(OiPr)$_4$" in Table 1) as a polymerization catalyst. The reaction vessel was depressurized to 0.8 kPa and heated to 200° C., kept at that temperature for 6 hours while distilled away the water formed with dehydration condensation reaction, and cooled by adding toluene into the reaction system, thereby obtaining a toluene solution of a polyester resin A-1 (polyester concentration 50%).

<Synthesis of Polyester Resin A-2>

A toluene solution of a polyester resin A-2 (polyester concentration 50%) was obtained in the same manner as that for the polyester resin A-1 except that the amount of the dimer acid charged was changed to 98.8 parts relative to 100 parts of the dimer diol.

<Synthesis of Polyester Resin A-3>

A toluene solution of a polyester resin A-3 (polyester concentration 50%) was obtained in the same manner as that for the polyester resin A-1 except that the amount of the dimer acid charged was changed to 100.9 parts relative to 100 parts of the dimer diol.

<Synthesis of Polyester Resin A-4>

A toluene solution of a polyester resin A-4 (polyester concentration 50%) was obtained in the same manner as that for the polyester resin A-1 except that the amount of the dimer acid charged was changed to 95.5 parts relative to 100 parts of the dimer diol.

<Synthesis of Polyester Resin B-1>

A polyester resin B-1 was obtained in the same manner as that for the polyester resin A-1 except that the amount of the dimer acid charged was changed to 44.2 parts relative to 100 parts of the dimer diol and the operation of adding toluene in the reaction system after heating was not performed.

<Synthesis of Polyester Resin B-2>

A polyester resin B-2 was obtained in the same manner as that for the polyester resin B-1 except that the amount of the dimer acid charged was changed to 40.8 parts relative to 100 parts of the dimer diol.

<Synthesis of Polyester Resin B-3>

A polyester resin B-3 was obtained in the same manner as that for the polyester resin B-1 except that the amount of the dimer acid charged was changed to 53.0 parts relative to 100 parts of the dimer diol.

<Synthesis of Polyester Resin B-4>

A polyester resin B-4 was obtained in the same manner as that for the polyester resin B-1 except that the amount of the dimer acid charged was changed to 88.3 parts relative to 100 parts of the dimer diol. Mw's of respective polyester resin described above are shown in Table 1 together with outlines of the polyester resins.

TABLE 1

| Polyester Resin | | A-1 | A-2 | A-3 | A-4 | B-1 | B-2 | B-3 | B-4 |
|---|---|---|---|---|---|---|---|---|---|
| Charged | PRIPOL 2033 | 100 | 100 | 100 | 100 | 100 | 100 | 100 | 100 |
| Ratio | PRIPOL 1009 | 99.1 | 98.8 | 100.9 | 95.5 | 44.2 | 40.8 | 53.0 | 88.3 |
| [part] | Ti(OiPr)$_4$ | 0.5 | 0.5 | 0.5 | 0.5 | 0.5 | 0.5 | 0.5 | 0.5 |
|  | Mw [×10$^4$] | 6.3 | 5.3 | 7.0 | 3.6 | 0.5 | 0.4 | 0.6 | 1.8 |

Example 1

To the toluene solution of the polyester resin A-1 were blended 2.5 parts of a polyisocyanate-based crosslinking agent (trade name "DURANATE TPA-100", manufactured by Asahi Kasei Chemicals, isocyanurate of hexamethylene diisocyanate; this is hereinafter referred to as TPA-100), and 0.1 parts of titanium diisopropoxybis(ethyl acetacetate) (titanium-based catalyst, trade name "ORGATICS TC-750", manufactured by Matsumoto Fine Chemical; this is hereinafter referred to as TC-750) as a crosslinking aid (catalyst), relative to 100 parts of the solid content of the resin, thereby preparing a polyester resin composition CA-1. A PET film of which the surface had been subjected to release treatment was prepared, and the above composition CA-1 was applied onto the releasable surface of the PET film to be 10 μm in dry thickness. The coated substrate was dried at 100° C. for 3 minutes, and maintained in an environment at 50° C. for 3 days, thereby forming a layer LA-1 on the releasable surface of the PET film. The gel fraction of the layer LA-1 was measured according to the above method, and was 42%.

To 100 parts of the solid content of the polyester resin B-1 were blended 35 parts of TPA-100 and 0.1 parts of TC-750, thereby preparing a polyester resin composition CB-1. The composition CB-1 was applied onto the releasable surface of a PET film of which the surface had been subjected to release treatment, to be 400 μm in dry thickness. The coated substrate was dried at 100° C. for 3 minutes, and maintained in an environment at 50° C. for 3 days, thereby forming a layer LB-1 on the releasable surface of the PET film. The gel fraction of the layer LB-1 was 85%.

The layers LA-1 were attached to both surfaces of the layer LB-1 with a hand roller. In that manner, a substrate-less pressure-sensitive adhesive sheet composed of a pressure-sensitive adhesive layer having a three-layered structure (that is, a laminate structure of LA-1/LB-1/LA-1) was obtained.

Example 2

In forming the layer LA-1 in Example 1, the composition CA-1 was applied on the releasable surface of the PET film to be 20 μm in dry thickness. The others were the same as in Example 1, thereby forming a layer LA-2. The gel fraction was 42%.

In forming the layer LB-1 in Example 1, the composition CB-1 was applied on the releasable surface of the PET film to be 200 μm in dry thickness. The others were the same as in Example 1, thereby forming a layer LB-2. The gel fraction was 85%.

The layers LA-2 were attached to both surfaces of the layer LB-2, thereby obtaining a substrate-less pressure-sensitive adhesive sheet composed of a pressure-sensitive adhesive layer having a three-layered structure.

Example 3

In forming the layer LA-1 in Example 1, the composition CA-1 was applied on the releasable surface of the PET film to be 80 μm in dry thickness. The others were the same as in Example 1, thereby forming a layer LA-3. The gel fraction was 42%.

In forming the layer LB-1 in Example 1, the composition CB-1 was applied on the releasable surface of the PET film to be 100 μm in dry thickness. The others were the same as in Example 1, thereby forming a layer LB-3. The gel fraction was 85%.

The layers LA-3 were attached to both surfaces of the layer LB-3, thereby obtaining a substrate-less pressure-sensitive adhesive sheet composed of a pressure-sensitive adhesive layer having a three-layered structure.

Example 4

To 100 parts of the solid content of the polyester resin A-2 were blended 3 parts of TPA-100 and 0.1 parts of TC-750, thereby preparing a polyester resin composition CA-4. A layer LA-4 having a thickness of 20 μm was formed in the same manner as that for the layer LA-2 in Example 2 except that the composition prepared here was used. The gel fraction was 51%.

To 100 parts of the solid content of the polyester resin B-2 were blended 35 parts of TPA-100 and 0.1 parts of TC-750, thereby preparing a polyester resin composition CB-4. A layer LB-4 having a thickness of 200 μm was formed in the same manner as that for the layer LB-2 in Example 2 except that the composition prepared here was used. The gel fraction was 88%.

The layers LA-4 were attached to both surfaces of the layer LB-4, thereby obtaining a substrate-less pressure-sensitive adhesive sheet composed of a pressure-sensitive adhesive layer having a three-layered structure.

Example 5

To 100 parts of the solid content of the polyester resin A-3 were blended 3.5 parts of TPA-100 and 0.1 parts of TC-750, thereby preparing a polyester resin composition CA-5. A layer LA-5 having a thickness of 20 μm was formed in the same manner as that for the layer LA-2 in Example 2 except that the composition prepared here was used. The gel fraction was 58%.

To 100 parts of the solid content of the polyester resin B-3 were blended 15 parts of TPA-100 and 0.1 parts of TC-750, thereby preparing a polyester resin composition CB-5. A layer LB-5 having a thickness of 200 μm was formed in the same manner as that for the layer LB-2 in Example 2 except that the composition prepared here was used. The gel fraction was 81%.

The layers LA-5 were attached to both surfaces of the layer LB-5, thereby obtaining a substrate-less pressure-sensitive adhesive sheet composed of a pressure-sensitive adhesive layer having a three-layered structure.

Example 6

To 100 parts of the solid content of the polyester resin A-4 were blended 10 parts of TPA-100 and 0.1 parts of TC-750, thereby preparing a polyester resin composition CA-6. A layer LA-6 having a thickness of 20 μm was formed in the same manner as that for the layer LA-2 in Example 2 except that the composition prepared here was used. The gel fraction was 83%.

To 100 parts of dimer diol (trade name, PRIPOL 2033, Mw 534, manufactured by Croda Japan) were blended 30 parts of TPA-100 and 0.1 parts of TC-750, thereby preparing a polyester resin composition CB-6. A layer LB-6 having a thickness of 200 μm was formed in the same manner as that for the layer LB-2 in Example 2 except that the composition prepared here was used. The gel fraction was 97%.

The layers LA-6 were attached to both surfaces of the layer LB-6, thereby obtaining a substrate-less pressure-sensitive adhesive sheet composed of a pressure-sensitive adhesive layer having a three-layered structure.

Example 7

To 100 parts of the solid content of the polyester resin B-4 were blended 5 parts of TPA-100 and 0.1 parts of TC-750, thereby preparing a polyester resin composition CB-7. A layer LB-7 having a thickness of 200 μm was formed in the same manner as that for the layer LB-2 in Example 2 except that the composition prepared here was used. The gel fraction was 75%.

The layers LA-6 prepared in Example 6 were attached to both surfaces of the layer LB-7, thereby obtaining a substrate-less pressure-sensitive adhesive sheet composed of a pressure-sensitive adhesive layer having a three-layered structure.

Example 8

The layers LA-2 prepared in Example 2 were attached to both surfaces of the layer LB-6 prepared in Example 6, thereby obtaining a substrate-less pressure-sensitive adhesive sheet composed of a pressure-sensitive adhesive layer having a three-layered structure.

Example 9

The layers LA-6 prepared in Example 6 were attached to both surfaces of the layer LB-2 formed in Example 2, thereby producing a substrate-less pressure-sensitive adhesive sheet composed of a pressure-sensitive adhesive layer having a three-layered structure.

Example 10

The layer LA-1 prepared in Example 1 was used directly as it was, as a substrate-less pressure-sensitive adhesive sheet composed of a single-layered pressure-sensitive adhesive layer.

Example 11

The layer LB-1 prepared in Example 1 was used directly as it was, as a substrate-less pressure-sensitive adhesive sheet composed of a single-layered pressure-sensitive adhesive layer.

These pressure-sensitive adhesive sheets were analyzed for SUS-adhering force and heat resistance retention temperature, according to the above-mentioned methods. The obtained results are shown in Table 2. In Table 2, Mw means the weight-average molecular weight of the polyester resin used in forming each layer.

TABLE 2

| | Constitution of Pressure-sensitive Adhesive Layer Type of Layer Thickness [μm] | | | Layer LA | | Layer LB | | Adhesive Force [N/20 mm] | Heat Resistance Retention [° C.] |
|---|---|---|---|---|---|---|---|---|---|
| | | | | Mw [×10$^4$] | Gel Fraction [%] | Mw [×10$^4$] | Gel Fraction [%] | | |
| Ex. 1 | LA-1 10 | LB-1 400 | LA-1 10 | 6.3 | 42 | 0.5 | 85 | 15 | 100 |
| Ex. 2 | LA-2 20 | LB-2 200 | LA-2 20 | 6.3 | 42 | 0.5 | 85 | 19 | 180 |
| Ex. 3 | LA-3 80 | LB-3 100 | LA-3 80 | 6.3 | 42 | 0.5 | 85 | 17 | 140 |
| Ex. 4 | LA-4 20 | LB-4 200 | LA-4 20 | 5.3 | 51 | 0.4 | 88 | 17 | 180 |
| Ex. 5 | LA-5 20 | LB-5 200 | LA-5 20 | 7.0 | 58 | 0.6 | 81 | 10 | 200 |
| Ex. 6 | LA-6 20 | LB-6 200 | LA-6 20 | 3.6 | 83 | 0.05 | 97 | 0.8 | 80 |
| Ex. 7 | LA-6 20 | LB-7 200 | LA-6 20 | 3.6 | 83 | 1.8 | 75 | 1.8 | 80 |
| Ex. 8 | LA-2 20 | LB-6 200 | LA-2 20 | 6.3 | 42 | 0.05 | 97 | 3.4 | 90 |

TABLE 2-continued

| Constitution of Pressure-sensitive Adhesive Layer | | | Layer LA | | Layer LB | | Adhesive Force [N/20 mm] | Heat Resistance Retention [° C.] |
|---|---|---|---|---|---|---|---|---|
| | Type of Layer | Thickness [μm] | Mw [×10⁴] | Gel Fraction [%] | Mw [×10⁴] | Gel Fraction [%] | | |
| Ex. 9 | LA-6 20 LB-2 200 LA-6 20 | | 3.6 | 83 | 0.5 | 85 | 1.2 | 60 |
| Ex. 10 | LA-1 10 | | 6.3 | 42 | — | — | 9.5 | 50 |
| Ex. 11 | LB-1 400 | | — | — | 0.5 | 85 | 1.0 | 40 |

As shown in the above Table 2, the pressure-sensitive adhesive sheets of Examples 1 to 5 each provided with a pressure-sensitive adhesive layer having a three-layered structure, in which the layer LA of a polyester resin $E_A$ having Mw of from $4 \times 10^4$ to $12 \times 10^4$ was laminated on both surfaces of the layer LB of a polyester resin $E_B$ having Mw of from $0.2 \times 10^4$ to $1 \times 10^4$, all have SUS-adhering force of not lower than 10 N/20 mm (in Examples 1 to 4, not lower than 15 N/20 mm) and heat resistance retention of not lower than 100° C. (in Examples 2 to 5, not lower than 140° C.), and have realized the contradictory characteristics of adhesive force and heat resistance retention both on high levels.

As opposed to these, Examples 6 to 9, in which at least one of the layers LA and LB was formed of a material not corresponding to the polyester resins $E_A$ and $E_B$ in the present invention, were obviously inferior to Examples 1 to 5 in point of adhesive force and heat resistance retention. Example 10, in which the layer LA-1 in Example 1 was evaluated alone, was poor in heat resistance retention. Example 11, in which the layer LB-1 in Example 1 was evaluated alone, had low adhesive force and was insufficient in heat resistance retention.

While specific examples of the present invention have been described in detail above, they are merely examples and not intended to restrict the scope of claims. The technique described in the scope of claims includes a variously changed or modified one of these examples described above.

The present application is based on the Japanese Patent Application (No. JP 2009-275347) filed on Dec. 3, 2009, the content of which are incorporated hereto by reference.

INDUSTRIAL APPLICABILITY

The pressure-sensitive adhesive composition of the present invention can realize heat resistance and adhesive force both on high levels in a good balance, and therefore, favorably applied for a pressure-sensitive adhesive sheet such as a pressure-sensitive adhesive tape, a pressure-sensitive adhesive label, and a pressure-sensitive adhesive film.

DESCRIPTION OF REFERENCE NUMERALS AND SIGNS 1, 2, 3, 4, 5, 6: Pressure-sensitive adhesive sheet
10: Substrate
21, 22: Pressure-sensitive adhesive layer
31, 32: Release liner
212: Layer LB
214, 216: Layer LA

The invention claimed is:

1. A pressure-sensitive adhesive sheet provided with a pressure-sensitive adhesive layer that comprises a polyester resin as a main component thereof,
wherein the pressure-sensitive adhesive layer has a laminate structure containing: at least one layer LA, which has a gel fraction of from 30 to 65%, and which is formed by crosslinking a polyester resin $E_A$ having a weight-average molecular weight of from $4 \times 10^4$ to $12 \times 10^4$; and at least one layer LB, which has a gel fraction of from 70 to 90%, and which is formed by crosslinking a polyester resin $E_B$ having a weight-average molecular weight of from $0.2 \times 10^4$ to $1 \times 10^4$, and
at least one surface of the pressure-sensitive adhesive layer is constituted by the layer LA.

2. The pressure-sensitive adhesive sheet according to claim 1, wherein the pressure-sensitive adhesive layer comprises at least two layers LA, and one surface and the other surface of the pressure-sensitive adhesive layer are constituted by the first layer LA and the second layer LA, respectively.

3. The pressure-sensitive adhesive sheet according to claim 1, wherein
the layer LA constituting at least one surface of the pressure-sensitive adhesive layer has a thickness $T_{LA}$ of from 5 μm to 100 μm.

4. The pressure-sensitive adhesive sheet according to claim 1, wherein the layer LB is laminated on the back of the layer LA that constitutes at least one surface of the pressure-sensitive adhesive layer, and the layer LB has a thickness $T_{LB}$ of from 10 μm to 2000 μm.

5. The pressure-sensitive adhesive sheet according to claim 1, wherein at least one surface of the pressure-sensitive adhesive layer is constituted by the layer LA having the thickness of $T_{LA}$, the layer LB having the thickness of $T_{LB}$ is laminated on the back of the layer LA, and $T_{LA}$ and $T_{LB}$ satisfy a relation of the following formula: $1 < T_{LB}/T_{LA} \leq 50$.

6. The pressure-sensitive adhesive sheet according to claim 1, wherein at least one of the polyester resin $E_A$ and the polyester resin $E_B$ is crosslinked with a tri- or more-functional isocyanate.

7. The pressure-sensitive adhesive composition according to claim 1, wherein each of the polyester resin $E_A$ and the polyester resin $E_B$ contains a polycarboxylic acid component and a polyalcohol component, and the combination of the polycarboxylic acid component and the polyalcohol component constituting the polyester resin $E_A$ is the same as the combination of the polycarboxylic acid component and the polyalcohol component constituting the polyester resin $E_B$.

8. The pressure-sensitive adhesive sheet according to claim 1, wherein each of the polyester resin $E_A$ and the polyester resin $E_B$ contains a polycarboxylic acid component and a polyalcohol component, and at least one polycarboxylic acid of the polycarboxylic acid component constituting the polyester resin $E_A$ and the polycarboxylic acid component constituting the polyester resin $E_B$ is an aliphatic dicarboxylic acid having a dimerized structure of an unsaturated fatty acid.

9. The pressure-sensitive adhesive sheet according to claim 1, wherein each of the polyester resin $E_A$ and the polyester resin $E_B$ contains a polycarboxylic acid component and a polyalcohol component, and at least one polyalcohol of the polyalcohol component constituting the polyester resin $E_A$ and the polyalcohol component constituting the polyester resin $E_B$ is an aliphatic diol having a structure where an aliphatic dicarboxylic acid of a dimerized unsaturated fatty acid is subjected to hydrogenation.

10. The pressure-sensitive adhesive sheet according to claim 1, wherein each of the polyester resin $E_A$ and the polyester resin $E_B$ is a polycondensate of a dimer acid with a dimer diol.

11. The pressure-sensitive adhesive sheet according to claim 1, which comprises 1 to 3 sheets of layers LA and 1 or 2 sheets of layers LB.

12. The pressure-sensitive adhesive sheet according to claim 1, wherein the weight-average molecular weight of the polyester resin $E_A$ is larger by 9 times or more than the weight-average molecular weight of the polyester resin $E_B$.

13. The pressure-sensitive adhesive sheet according to claim 1, wherein the layer LA has a gel fraction $G_{LA}$ and the layer LB has a gel fraction $G_{LB}$, satisfying $G_{LB}/G_{LA} \geq 1.2$.

14. The pressure-sensitive adhesive sheet according to claim 1, wherein the layer LB is formed by crosslinking only a polymer composition containing the polyester resin $E_B$.

15. The pressure-sensitive adhesive sheet according to claim 1, wherein the layer LB is formed by crosslinking only a polyester resin composition containing the polyester resin $E_B$.

16. The pressure-sensitive adhesive sheet according to claim 1, wherein the layer LB is formed by crosslinking only the polyester resin $E_B$.

* * * * *